United States Patent [19]
Averill

[11] Patent Number: 5,815,688
[45] Date of Patent: Sep. 29, 1998

[54] VERIFICATION OF ACCESSES IN A FUNCTIONAL MODEL OF A SPECULATIVE OUT-OF-ORDER COMPUTER SYSTEM

[75] Inventor: Gregory S. Averill, Fort Collins, Colo.

[73] Assignee: Hewlett-Packard Company, Palo Alto, Calif.

[21] Appl. No.: 728,088

[22] Filed: Oct. 9, 1996

[51] Int. Cl.[6] ................................................ G06F 11/00
[52] U.S. Cl. ...................... 395/500; 395/575; 364/264.3; 364/DIG. 1
[58] Field of Search ............................... 395/183.18, 500, 395/650, 575; 371/51.1; 364/264.3, 264.5, DIG. 1

[56] References Cited

U.S. PATENT DOCUMENTS

| | | | |
|---|---|---|---|
| 4,890,224 | 12/1989 | Fremont | 364/200 |
| 5,155,843 | 10/1992 | Stamm et al. | 395/575 |
| 5,276,828 | 1/1994 | Dion | 395/425 |
| 5,404,496 | 4/1995 | Burroughs et al. | 395/575 |
| 5,406,504 | 4/1995 | Denisco et al. | 364/580 |
| 5,539,911 | 7/1996 | Nguyen et al. | 395/800 |
| 5,592,616 | 1/1997 | Finch et al. | 395/183.18 |
| 5,617,534 | 4/1997 | Balmer et al. | 395/183.18 |
| 5,629,950 | 5/1997 | Godiwala | 371/51.1 |

OTHER PUBLICATIONS

A Low-Overhead Coherence Solution For Multiprocessors With Private Cache Memories, of Mark S. Papamaroos et al., 1984 IEEE, pp. 348–354.

Advanced Performance Features of the 64–Bit PA–8000, of Doug Hunt, 1995 IEEE, pp. 123–128.

Verification, Characterization, and Debugging of the HP PA 7200 Processor, of Thomas B. Alexander et al., Feb. 1996 Hewlett–Packard Journal, pp. 34–43.

Thomas B. Alexander et al., "Verification, characterization, and debugging of the HP PA 7200 Processor", Hewlett–Packard Journal, pp. 34–43, 1996.

Doug Hunt, "Advanced performance features of the 64–bit PA–8000", IEEE, pp. 123–128, 1995.

Mark S. Papamaroose et al., "A low–overhead coherence solution for multiprocessors with private cache memories", IEEE, pp. 348–354, 1984.

*Primary Examiner*—Kevin J. Teska
*Assistant Examiner*—Hani M. Kazimi

[57] ABSTRACT

A system and method for testing and verifying the correctness of cache accesses on a model or implementation of a processor that performs speculative and or out-of-order instruction execution. For each behavioral model of a processor under test in a simulation system, an architectural model is created that is fed the same instruction stream and system bus stimulus. The architectural model is capable of correctly and independently executing the instruction stream. The cache and TLB state of the architectural model are kept synchronous with those of the behavioral model under test. Cache synchronization is achieved by reporting, matching and verifying all speculative cache activity and all out-of-order cache accesses, move-ins and move-outs by the behavioral model as it occurs rather than in natural program order.

12 Claims, 6 Drawing Sheets

VERIFICATION OF ACCESSES IN A FUNCTIONAL MODEL OF A SPECULATIVE OUT-OF-ORDER COMPUTER SYSTEM

FIELD OF THE INVENTION

The present invention relates generally to verification methods for testing the operation and design of a computer system, and more particularly, to a system and method for verifying the correctness of cache accesses in a functional model of an out-of-order speculative computer system.

BACKGROUND OF THE INVENTION

Over the past few years the integrated circuit process technology industry has experienced rapid technological advances. Specifically, the ability to provide ever-increasing density and functionality on a single VLSI chip has resulted in a dramatic growth in chip complexity and continually decreasing chip sizes. In addition, various performance techniques have been developed to increase processor speeds. One such technique is instruction pipelining. Instruction pipelining is known in the art. For a detailed description with particular context to the computer architecture to which the present invention may be used to test and verify, see D. Hunt, *Advanced Performance Features of the 64-Bit PA-8000*, Proceedings of COMPCON '95, Mar. 5–9, 1995, pp. 123–128, incorporated herein by reference. The goal of instruction pipelining is to sustain the execution rate of instructions at a maximum level of completed instructions per clock cycle so as to avoid wasting valuable microprocessor clock cycles while waiting for a prior instruction to complete. One modern technique for maximizing the performance of a microprocessor involves fetching several instructions from an instruction cache or memory at once and storing them in a fast on-chip instruction buffer until execution time. This technique attempts to ensure a continual supply of instructions while hiding memory latency.

Another technique for sustaining a maximized execution rate of instructions is to execute instructions out-of-order. Out-of-order instruction execution exploits instruction level parallelism and also allows cache and memory latency to be hidden. When blocked by an instruction that is waiting for data to be returned from memory, out-of-order instruction execution allows the microprocessor to execute instructions located later in the instruction stream which are independent of the blocking instruction and its data. Out-of-order instruction execution reduces the number of instruction pipeline "bubbles" and significantly improves performance.

Yet another technique for maximizing instruction execution performance is to speculatively execute instructions. With speculative execution, a computer will execute certain instruction paths before it is known whether the path will be taken. If the computer chooses an instruction path that is not taken, the results of the speculative instruction path execution are discarded.

Out-of-order and speculative instruction execution both result in lines of data from memory being moved into the processor's cache. These data fetches are not necessarily related to the program order instruction stream being executed. The result is that out-of-order and speculative behavior may cause lines of data to be moved into and out of the cache memory system in an unpredictable manner which an independent simulator may find impossible to predict.

Out-of-order instruction execution by a processor presents an added level of complexity to the problem of pre-fabrication processor testing and verification. Prior to committing a processor design to be being manufactured in silicon, a behavioral model of the microprocessor is created and tested. Test sequences of instructions are run on the behavioral model and some method is used to determine if the behavior of the model is architecturally correct. Each time a speculative out-of-order processor makes an access to its cache memory, due to a load or store instruction or as the result of a system bus transaction, the result of that access must be checked for correctness.

One prior solution for testing and verifying the correctness of cache accesses on a model or implementation of an out-of-order speculative processor is to create a cycle accurate emulator that can predict the behavior of the processor under all stimulus. This approach has generally been abandoned due to the complexity of recent generations of processors.

Another prior solution for testing and verifying the correctness of cache accesses on a model or implementation of an out-of-order speculative processor is to provide a record of system bus events that occurred during the test case to an architectural simulator. The simulator then applies the bus events to its own cache with the goal of achieving the same final state as that of the processor under test. This solution is limited in that cache accesses are not checked as they occur. Incorrect behavior may not leave a trace in the final memory or cache state because it was overwritten. Another limitation is that the precise point of failure is not directly identified. In addition, this approach does not always give the simulator sufficient information in order to correctly track the order of events that occurred on the model under test. When simultaneous interacting events occur, the simulator must make assumptions about what occurred, and coverage is lost.

Another prior solution for testing and verifying the correctness of cache accesses on a model or implementation of an out-of-order speculative processor is to create self-checking code sequences. Each instruction stream run on each of N processors in an N-way system are designed to have knowledge of all other related accesses that could occur. The final memory state of the system is examined to determine if that state is consistent with the N instruction streams. This method is cumbersome and difficult to implement in a way that fully exercises the processor model under test. This method imposes structure on test cases which decrease the scope and coverage of the case. Additionally, not all cache access failures are identified; if the result of an access failure is overwritten before the end of the test case such that it does not appear in the final state of the memory system, then knowledge of that failure is lost.

Accordingly, an object of the invention is to provide a system and method for testing and verifying the correctness of cache accesses on a model or implementation of an out-of-order speculative processor which overcomes the limitations of the prior art. Another object of the invention is to provide a such a system and method in the context of a multi-processor environment.

SUMMARY OF THE INVENTION

In accordance with a preferred embodiment of the invention, there is presented a system and method for testing and verifying the correctness of cache accesses on a model or implementation of an out-of-order speculative processor. The test system and method of the present invention overcomes the limitations of previous approaches. For each behavioral model of a processor under test in a simulation system, an architectural model is created that is fed the same instruction stream and system bus stimulus. The architectural model is capable of correctly and independently executing the instruction stream. The cache and TLB state of the architectural model are kept synchronous by a synchronizer with those of the behavioral model under test. The rate of progress in the execution of the instruction stream is also synchronized by the synchronizer, which includes matching all out-of-order and speculative execution effects.

The cache of the architectural model is kept synchronous with the cache of the behavioral model as follows. All speculative cache activity by behavioral model is reported to, matched by, and verified as they occur by the synchronized simulator. In addition, all out-of-order cache accesses, move-ins and move-outs are reported to, matched by, and verified as they occur by the synchronized simulator. All of the changes to the cache by the behavioral model are made to the simulator in the order which matches the speculative, out-of-order behavior of the behavioral model under test rather than the natural program order. As a result, and also since the architectural model simulator must execute the instruction stream in program order, there are times when the architectural model simulator cannot find the needed data in the cache that a given instruction needs to execute. The synchronizer then either supplies the data from main memory without moving the line into the simulator cache again or supplies the data from a private synchronizer copy maintained by the synchronizer under certain conditions.

BRIEF DESCRIPTIONS OF THE DRAWINGS

The objects and advantages of the invention will become more apparent and more readily appreciated from the following detailed description of the presently preferred exemplary embodiment of the invention taken in conjunction with the accompanying drawings, of which:

DETAILED DESCRIPTION OF THE PRESENT INVENTION

1. Description

The preferred embodiment of the present invention is discussed below with reference to the drawings, where like reference numbers represent like elements.

Figure 1:
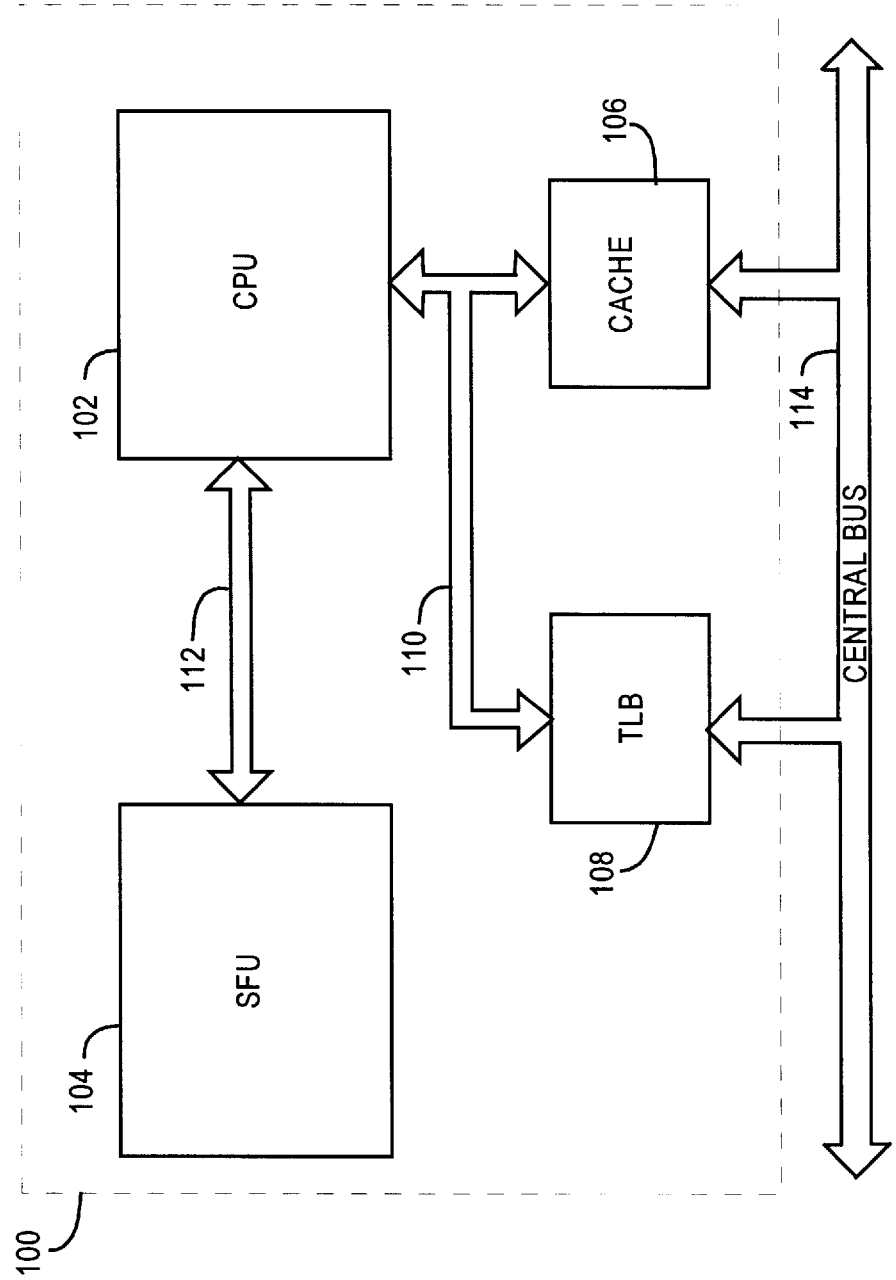
FIG. 1 is a high-level block diagram of the computer architecture of a processor 100 which supports out of order instruction execution.

FIG. 1 is a high-level block diagram of the computer architecture of a processor 100 which supports out of order instruction execution. Although representative of the type of computer architecture on which the present invention may test and verify strongly ordered instruction handling, the computer architecture of processor 100 is not intended in any way to limit the use of the present invention. Accordingly, the computer architecture to which the present invention may be applied may include any other computer architecture or multi-processor system which supports speculative out-of-order instruction execution and which utilizes a cache memory for data accesses. The computer architecture shown in FIG. 1 is a model of the PA-8000 RISC chip, manufactured by Hewlett-Packard Company, Palo Alto, CA. For a more detailed description of the architecture of the PA-8000, see D. Hunt, *Advanced Performance Features of the 64-Bit PA*-8000, Proceedings of COMPCON '95, Mar. 5–9, 1995, pp. 123–128, incorporated herein by reference.

As shown in FIG. 1, processor 100 includes a central processing unit (CPU) 102. The CPU 102 receives instructions and executes them. Depending on the instruction, the CPU may delegate certain work to be completed to a special function unit 104. Special function units are dedicated hardware units optimally designed to perform a given function. The use of special function units substantially increases the performance of a processor. Control signals and associated data may be passed between the CPU 102 and special function unit 104 via bus 112. In addition, certain instructions (e.g., a LOAD or STORE) require data to be accessed. In the computer architecture 100 shown in FIG. 1, all data accessed by the CPU 102 is first moved into a cache 106. Move-in rules are known in the art. Typically, whenever a request for access to a given data item is issued and the cache does not contain the requested data item, the entire page (i.e., block of data) in which the requested data item resides is moved into the cache at the same time. Most modern computer system also support virtual addressing. To support virtual addressing, a translation look-aside buffer (TLB) 108 is typically used to provide virtual to absolute address translations. In operation, the CPU 102 requests a memory address to be accessed on bus 110. The TLB 108 generally includes special hardware that signals a hit when the requested address is in the cache 106 or a miss when the requested address is not in the cache 106. If a TLB miss occurs, special hardware causes the requested address to be moved into the cache 106 via central bus 114. The TLB 108 is also updated at this time via central bus 114. Whether a hit or miss occurs, the data accompanying the memory access request is either returned from (for reads) or sent to (for writes) the cache 106 via bus 110.

Figure 2:
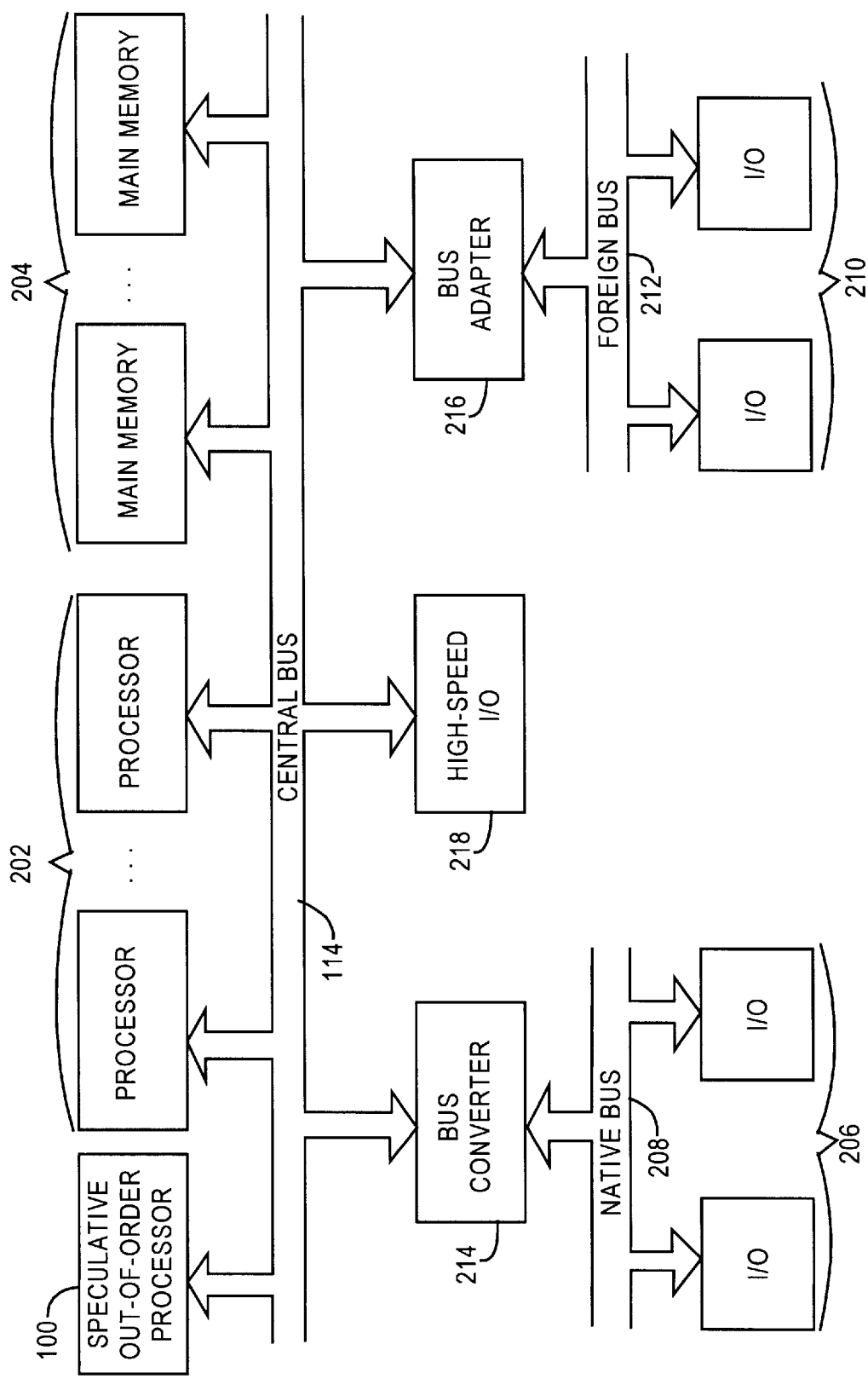
FIG. 2 is a high level block diagram of a multi-processor system 200 in which the processor 100 of FIG. 1 might operate.

FIG. 2 is a high level block diagram of a multi-processor system 200 in which the processor 100 of FIG. 1 might operate. As shown in FIG. 2, the multi-processor system 200 may include the processor 100, a plurality of other processors 202 (which may or may not comprise the same computer architecture of processor 100), a plurality of main memories 204, and a plurality of I/O adapters 206, 210. The processor 100 and other processors 202 access the main memories 204 on the central bus 114 and I/O adapters 206, 210 on remote busses 208, 212. To access the I/O adapters 206, 210 shown in the multi-processor system 200, the processor 100 and other processors 202 must broadcast a request to the address of the I/O adapter it wishes to access. A bus converter 214 or bus adapter 216 recognizes the broadcast address and provides effective communication between the central bus 114 and its associated remote bus 208, 212, respectively. The requested I/O adapter 206 or 210, recognizes its address on the remote bus 208, 212 and responds to the request. The bus converter 214 or bus adapter 216 also responds to requests from the I/O adapters to the processors 100 or 202 to provide effective communication between the remote bus 208, 212 and the central bus 214. In addition, the multi-processor system 200 may also include high-speed I/O adapters 218. The high bandwidth capability of high-speed I/O adapters 218 allows them to be connected directly to the central bus 114.

The cache 106 of processor 100 functions as a high-speed intermediate storage buffer which contains recently accessed data. As a result, the cache 106 may not be coherent (i.e., containing the same data values in each copy of the memory location) with the main memories 204 at all times. Data is brought into the cache 106 only as a result of references made by the instruction stream. Furthermore, data may be removed from the cache 106 by hardware at any time. To ensure that the main memory gets updated each time the processor changes the value of a copy of a memory location contained in the cache 106, a consistent software view of cache operation requires that implementations never write a clean cache line back to memory. "Clean" may be defined as "not stored into" as opposed to "dirty" which means "stored into". Generally, the cache move-in rules write all dirty cache lines to update the main memory before removing them from the cache. While this simple algorithm may suffice in a computer system which does not support speculative out-of-order instruction execution, the cache management algorithm becomes much more complex in a system which supports speculative out-of-order instruction execution since speculative and out-of-order instruction execution precludes predictable knowledge of cache contents. In the preferred embodiment, each processor supports the industry standard MESI protocol, which is described in detail in M. Papamarcos and J. Patel, "A Low Overhead Coherent Solution for Multiprocessors with Private Cache Memories," in Proceedings of the 11$^{th}$ International Symposium on Computer Architecture, IEEE, New York (1984), pp. 348–354, incorporated herein by reference. Thus, it is clear that testing and verification of cache accesses in a speculative out-of-order processor may become quite complex. It is also clear that the testing and verification becomes even more complex when the speculative out-of-order processor operates in a multi-processor system.

Figure 3:
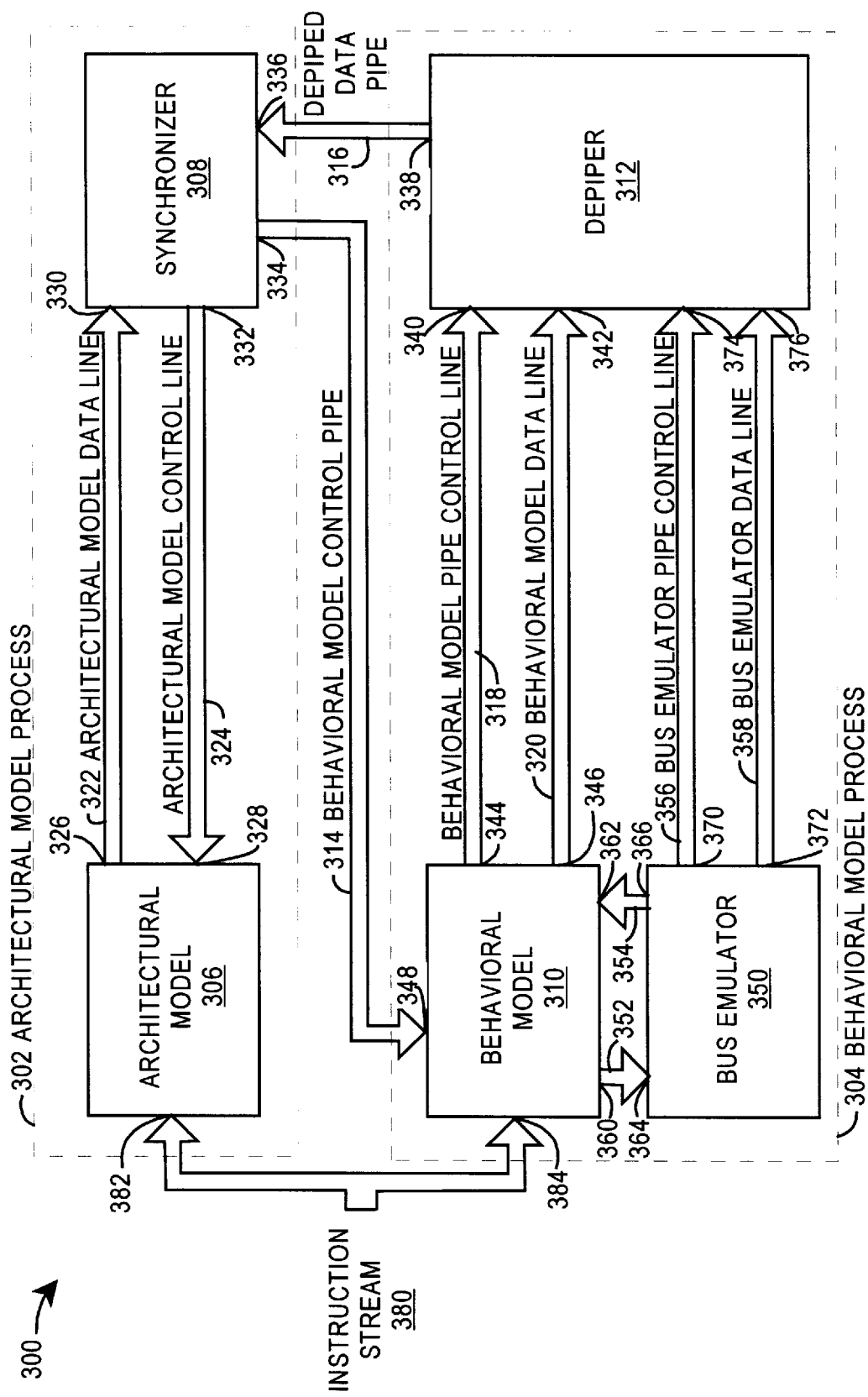
FIG. 3 is a high level system diagram illustrating the structure and interfaces of the preferred embodiment of the present invention.

FIG. 3 illustrates a preferred embodiment of the present invention. In the preferred embodiment, computer-based test system 300 is executed on a Hewlett Packard HP 700 series computer, in a UNIX environment, manufactured by Hewlett-Packard Company, Palo Alto, Calif., USA. However, the present invention can be implemented on any present or future developed computer platform utilizing any present or future developed operating system.

There are two processes in the test system of the preferred embodiment: an architectural model process 302 and a behavioral model process 304. A process is a set of instructions or routines which perform a functionally related task. Embedded within the architectural model process 302 is the architectural model 306 and the synchronizer 308. Embedded within the behavioral model process 304 is the behavioral model 310, and, as a diagnostic block, the depiper 312. The behavioral model process 304 may optionally include a bus emulator 350 if the computer architecture under test is to be tested within its external environment. The bus emulator 350 emulates the bus activity on the central bus 114 shown in FIG. 2. The external environment could include, for example, I/O devices or other processors which may or may not execute instructions speculatively or out-of-order. The architectural model 306 serves as a reference model against which the behavioral model 310 is verified. The architectural model 306 outputs correct results under all stimuli. The behavioral model 310 is the model under test. Architectural models are well known in the art. For a detailed description of a suitable architectural model, see D. Magenheimer, *The HP Precision Simulator*, Hewlett-Packard Journal, Vol. 37, no. 8, August, 1986, pp. 40–43, incorporated herein by reference. Behavioral models are also well known in the art. For a detailed description of a suitable behavioral model, see Kohlhardt, Gaddis, et. al., *Design, Verification, and Test Methodology for a VLSI Chip Set*, Hewlett-Packard Journal, Vol. 38, no. 9, September 1987, pp. 18–26, incorporated herein by reference. Bus emulators are also well-known in the art. In the present invention, the architectural model 306, the behavioral model 310, and the bus emulator 350 execute concurrently.

In the preferred embodiment, the architectural model 306 models the CPU, cache and TLB of a computer architecture to be verified, such as that of processor 100 in FIG. 1. It executes instructions strictly in order. In alternative embodiments, the architectural model may model other high-level requirements of a computer system, such as input/output requirements. Also, the architectural model 306 may be a verified behavioral model which may or may not model the same architectural implementation as the behavioral model 310 being verified. The architectural model 306 may also be a hardware module which is known to meet the required specifications. The architectural model 306 has an output 326 for transmitting state information resulting from the simulations to synchronizer 308. Architectural model 306 also has input 328 for receiving commands from synchronizer 308.

The behavioral model 310 is a model or implementation of the computer architecture under test which is to be functionally verified to conform to the architectural model 306. The behavioral model 310 may take the form of, but not be limited to, a high-level descriptive software model of how a particular hardware module functions. Alternatively, it may take the form of a logic simulation of a tile implementation or a switch implementation of the implementation's transistor network. Moreover, the behavioral model 310 may also be a hardware module which needs to be verified against the presently operational hardware module represented by architectural model 306. In the preferred embodiment, the behavioral model models the CPU, cache, TLB and speculative and out-of-order instruction execution behavior of the processor shown in FIG. 100. The behavioral model 310 has an input 348 for receiving control information instructing the behavioral model when and what to execute, and an input 362 for receiving an external environment input/output (I/O) bus state. The behavioral model 310 contains two outputs; output 344 for transmitting specific information on how data is moving through the pipeline, output 346 for transmitting behavioral model state information to the depiper 312 for translation, and output 360 for transmitting the behavioral model I/O bus state.

The bus emulator 350 is a functional model of the external system environment in which the computer architecture under test operates. The bus emulator 350 emulates the I/O bus states which the external system environment would generate in response to I/O bus states received from the processor under test. For example, with reference to FIG. 2, the bus emulator 350 would emulate the events occurring on the central bus 114 as a result of all the devices connected to it except for processor 100. Accordingly, in the test system 300 of the preferred embodiment, the bus emulator 350 has an input 364 for receiving a behavioral model I/O bus state from the behavioral model 310, and an output 366 for transmitting the external environment I/O bus state. The bus emulator 350 also has an output 370 for transmitting bus emulator state information to the depiper for translation.

In operation, the architectural model 306 and the behavioral model 310 simultaneously receive instructions from an instruction stream 380. The architectural model 306 receives instructions at an input 382 and the behavioral model 310 receives instructions at an input 384.

In the preferred embodiment, the instruction traces of the behavioral model 310 are being compared to those of the architectural model 306. When this technique is utilized in a pipelined implementation, a depiper 312 may be used to convert the pipelined execution trace of the behavioral model 310 and bus emulator 350 into the instruction trace of the architectural model. Translators such as depiper 312 are also well known in the art. The depiper 312 may be a subroutine, separate module, or separate computer, depending on the form of the architectural and behavioral models. For example, if the architectural model 302 processes instructions sequentially and the behavioral model 306 processes instructions in parallel, the depiper 312 may be a deparallizer which translates the behavioral model's parallel output to a sequential form for comparison with the architectural model's state information. In the alternative embodiment of the architectural model and behavioral model being hardware modules, the behavioral model, being developed at a later date to replace the architectural model, may perform the specified functions quicker and more efficiently. In such a case, depiper 312 may also be a hardware module, having to perform buffering and waiting functions in order to provide the synchronizer 304 with the data necessary to compare with the results of the older, slower architectural model. Depiper 312 contains output 338 for transmitting translated behavioral model state information. Depiper 312 also contains inputs 340 and 342 for receiving control information and behavioral state information, respectively, from the behavioral model 310. Depiper 312 also contains inputs 374 and 376 for receiving control information and behavioral state information, respectively, from the bus emulator 350.

Interprocess communication channels 314 and 316, defined as pipes in UNIX, are used to communicate between the architectural model process 302 and the behavioral model process 304. The behavioral model control pipe 314 conveys commands from synchronizer 308 located in architectural model process 302 to behavioral model process 304. The other interprocess communication pipe is the depiped data pipe 316 which conveys depiped behavioral model data from depiper 312 located in the behavioral model process 304 to the synchronizer 308 located in the architectural model process 302.

Within the behavioral model process 304, depiper 312 receives the behavioral model state information including behavioral model events such as cache accesses from the behavioral model 310 via behavioral model data line 320. Depiper 312 receives the bus emulator state information from the bus emulator 350 via bus emulator data line 358. The depiper 312 then converts the behavioral model's state information and the bus emulator's state information into a depiped state and transfers the data to synchronizer 308 via depiped data pipe 316. The depiper 312 receives behavioral model pipe control signals from the behavioral model 310 via behavioral model pipe control line 318 and bus emulator pipe control signals from the bus emulator 350 via bus emulator pipe control line 356. Pipe control signals represent the necessary information for the depiper 312 to know when to take the instruction traces from the behavioral model.

The verification process is controlled in real-time by synchronizer 308 which controls architectural model 306 and behavioral model 310 by transmitting commands and state change information via architectural model control line 324 and behavioral model control line 314, respectively. The synchronizer 308 receives requested data and state information from the architectural model 306 and the behavioral model 310 via data lines 322 and 320, respectively. This real-time execution reduces the amount of total simulation time required to verify a particular implementation because the time between each error identification is reduced. In addition, real-time verification reduces the amount of memory required to store intermediate traces during the verification process.

The synchronizer 308 identifies points in the models' executions, instructs each model to simulate to a synchronization point and report relevant state information, and verifies the state information received from the two models in real time and flag errors. For purposes of the present invention, one type of synchronization point occurs each time the behavioral model 310 retires an instruction. A suitable synchronizer for performing the above-described functions which may be used in the present invent is described in detail in U.S. Pat. No. 5,404,496 to Burroughs et al.

Figure 4:
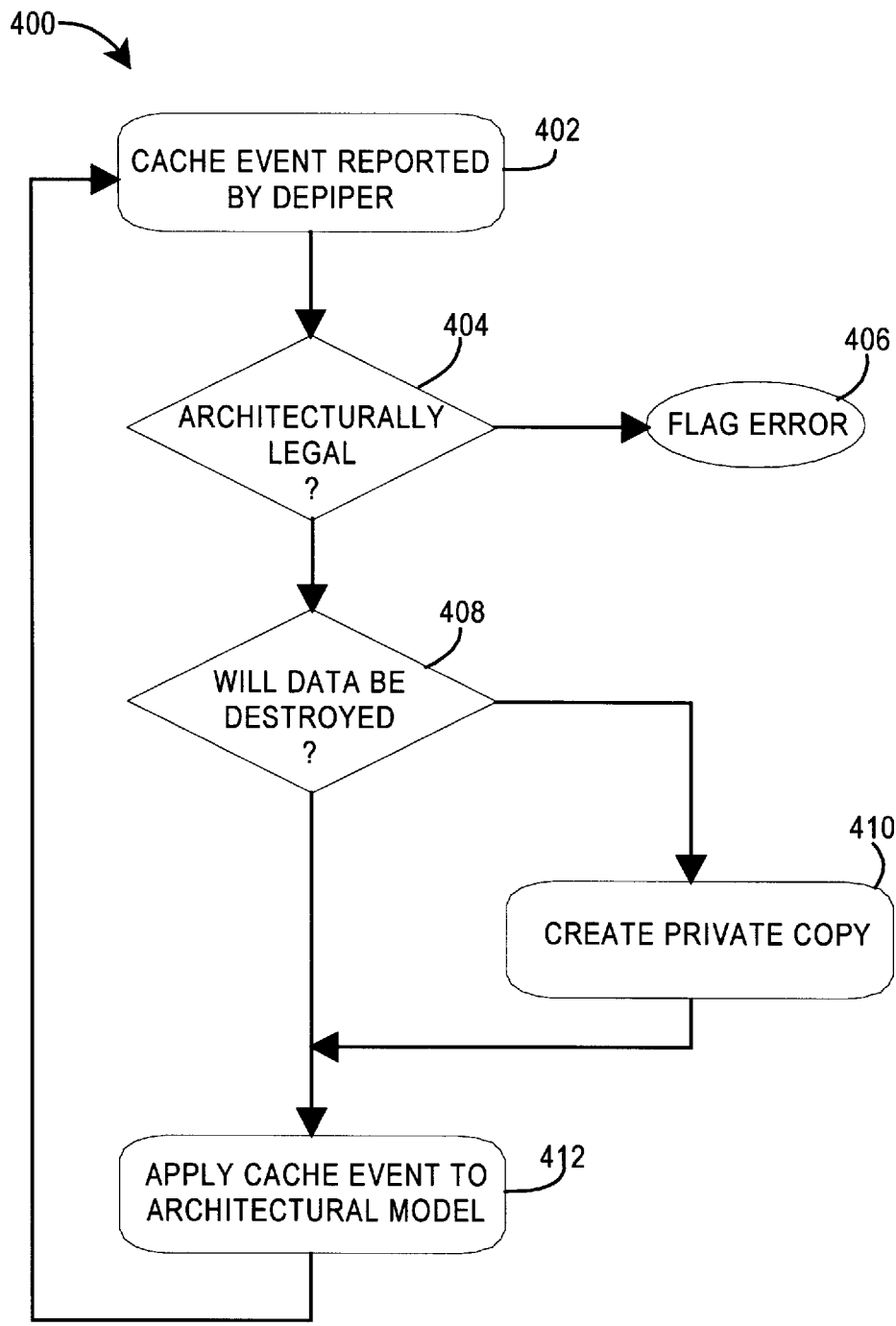
FIG. 4 is a flowchart of a preferred embodiment process for verifying the correctness of speculative out-of-order cache accesses by the behavioral when the synchronizer receives cache access events from the behavioral model.
Figure 5:
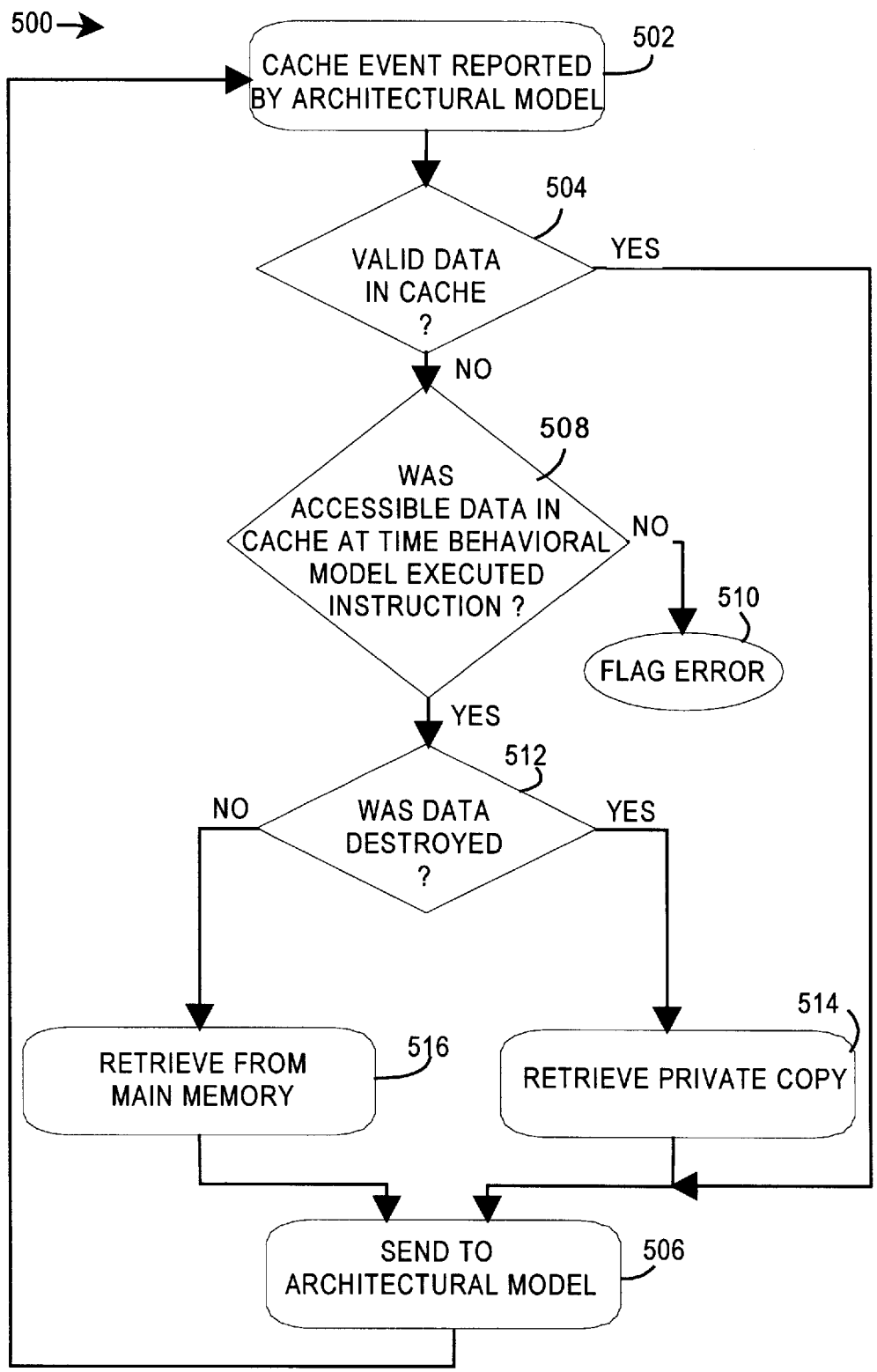
FIG. 5 is a flowchart of a preferred embodiment process for verifying the correctness of speculative out-of-order cache accesses by the behavioral when the synchronizer receives cache access events from the architectural model.
Figure 6:
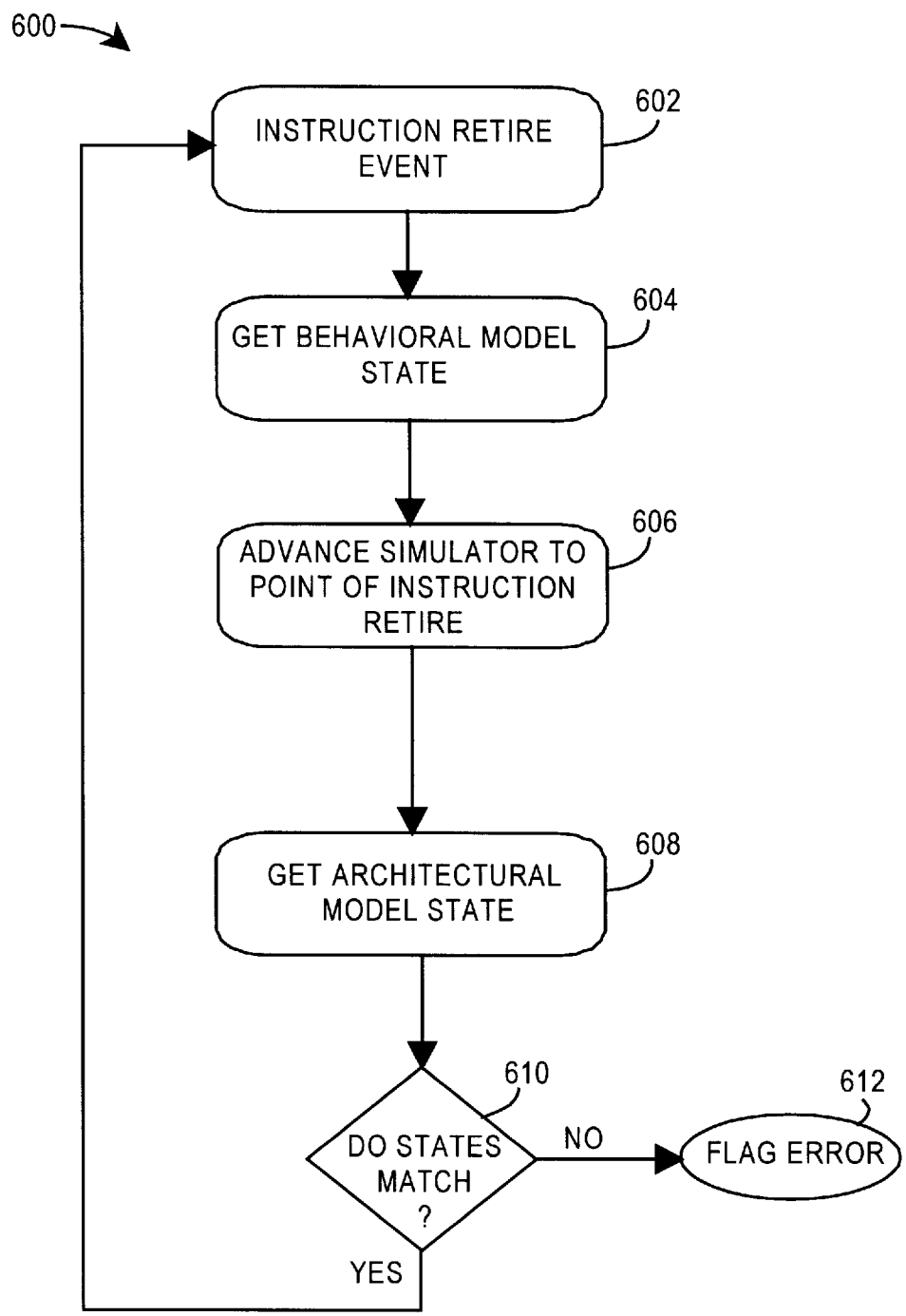
FIG. 6 is a flowchart of a preferred embodiment verification process executed by synchronizer for checking the correctness of the cache accesses by the behavioral model.

The synchronizer 308 of the present invention also synchronizes the cache of the architectural model 306 with that of the behavioral model 310 and verifies the correctness of all cache accesses, modifications, move-ins and move-outs. FIGS. 4–6 illustrate the flowcharts of a preferred embodiment process for synchronizing and verifying correctness of the cache activity. FIGS. 4 and 5 show the synchronization of the caches and FIG. 6 shows the verification process. Preferably each of the processes shown in FIGS. 4–6 execute concurrently.

FIG. 4 shows the process 400 executed by synchronizer 308 when it receives cache access events from the behavioral model 310 as reported by the depiper 312. As shown in FIG. 4, the synchronizer 308 receives a cache event from the depiper 312 in step 402. The cache event may include a cache access, modification, move-in or move-out. The depiper reports each cache event in the order in which they occur in the behavioral model 310. Accordingly, since the behavioral model preferably models a speculative out-of-order processor, the cache events may occur in a non-program order. In a step 404, the synchronizer 308 determines whether the cache event was architecturally legal. The determination is made according to the requirements of speculative and/or out-of-order instruction execution as specified by the architectural model. If it is determined in step 404 that the cache event was not legal, an error is flagged in step 406. If the cache event was legal, the synchronizer 310 determines in step 408 if the cache event will cause data in the architectural model's cache to be destroyed. If it is determined in step 408 that data will be destroyed, the synchronizer 310 saves a private copy of the data in step 410. The private copy of the data saved in step 410 is kept until all instructions that were active in the out-of-order queues of the behavioral model and which could have used the data before it was destroyed have retired. Finally, in step 412 the cache event is applied to the cache of the architectural model 406. Accordingly, it is clear that the cache of the architectural model 306 is kept synchronous with the cache of the speculative out-of-order behavioral model under test.

FIG. 5 shows the process 500 executed by synchronizer 308 when it receives cache access events from the architectural model. As shown in FIG. 5, the synchronizer 308 receives a cache event from the architectural model 306 in step 502. The cache event may include a cache access, modification, move-in or move-out. The cache line that the architectural model 306 needs to access may not be present in its own cache at this time due to the synchronization of its cache with the cache of the behavioral model and out-or-order or speculative instruction execution by the behavioral model. Thus, in step 504, the synchronizer 308 determines whether the needed cache line is present in the cache. If it is determined in step 504 that the cache line is in the cache, the requested cache line is allowed to be accessed in step 506. If the cache line is not in the cache, however, the synchronizer 310 must determine in step 508 whether the needed cache line was in the cache at the time the behavioral model executed the instruction (either speculatively or out-of-order). If it is determined in step 508 that cache line was not present or that it was not accessible according to its protection level, an error is flagged in step 510. If the cache line was present in the cache at the time the behavioral model executed the instruction, the synchronizer 308 determines whether or not the data was destroyed at that time in step 512. If the data was destroyed, the synchronizer 310 fetches its private copy of the data in step 514. Otherwise, in step 516 it fetches a copy of the data from the main memory and sends it to the architectural model as if it was fetched from the architectural model's cache but does not actually move it into the cache. The process 500 is repeated for each cache event reported by the architectural model 306.

FIG. 6 shows the actual verification process 600 executed by synchronizer 308 for checking the correctness of the cache accesses by the behavioral model 310. The verification process 600 is performed at the time instruction retire events are received from the behavioral model 310 as reported by the depiper 312. The significance of an instruction retire event is that it is only at retire time that the results of the instruction are committed irrevocably to the state of the machine. In the behavioral model of the preferred embodiment, instructions may be speculatively executed or executed out-of-order, or both. Speculative instructions may never retire. However, they may change the contents of the cache according to architecturally defined rules of speculation. The synchronizer verifies that cache events occurring in the behavioral model follow the rules of speculation. Out-of-order instructions, on the other hand, may or may not retire but if they do, they must retire the results in program order. Instruction retire events may be conveniently used as synchronization points by the simulator since the instructions must be retired in program order. Thus, the resulting behavioral model state from a retired instruction in the behavioral model must match the resulting architectural model state from the same retired instruction in the architectural model. As shown in FIG. 6, the synchronizer 308 receives an instruction retire event from the depiper 312 in step 602. The synchronizer 308 then sends a command to the behavioral model 310 in step 604 to get the behavioral model state. In step 606 the synchronizer 308 advances the simulator to the point that the same instruction in the architectural model's instruction stream gets retired. The synchronizer 308 then sends a command to the architectural model 310 in step 608 to get the architectural model state. At this synchronization point, the behavioral model state and the architectural model state should match. This is true because, although the behavioral model 310 performs speculative and out-of-order instruction execution, it fetches and retires instructions strictly in order. Since the architectural model 306 executes instructions strictly in order, a comparison of the states of the two models after an instruction fetch or an instruction retire should result in the same state. In step 610, the two states are compared. If they do not match, an error is flagged in step 612. Otherwise the process 600 is repeated until no more instructions are retired from the behavioral model 310.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A computer-based test system for verifying cache access handling in a computer architecture under test, said computer architecture under test comprising a data cache and supporting speculative and or out-of-order instruction execution, said test system comprising:
   an architectural model which models high-level architectural requirements of said computer architecture and generates correct results under all received instruction test stimuli;
   a behavioral model which models said high-level architectural requirements of said computer architecture and executes said received instruction test stimuli according to speculative and or out-of-order instruction execution behavior defined by said computer architecture;
   a synchronizer which controls the execution of said architectural model and said behavioral model, matches all out of order instruction execution effects, and synchronizes said architectural model cache with said behavioral model cache by:
   (i) receiving a behavioral model cache access event, said behavioral model cache access event affecting behavioral model cache data;
   (ii) verifying that said behavioral model cache access event is legal according to architectural rules of speculative and or out-of-order instruction execution; and
   (iii) if legal, applying said behavioral model cache access event to said architectural model cache.

2. The computer-based test system of claim 1, wherein before applying said behavioral model cache access event to said architectural model cache in step (iii), said synchronizer performs the step of:
   (iv) saving a private copy of affected architectural model cache data in the architectural model cache which will be affected by application of said behavioral model cache access event and which will be destroyed upon application of said behavioral model cache access event and which may still be used by any active instruction contained in an out-of-order instruction queue, wherein execution of each active instruction contained in said out-of-order instruction queue has been started.

3. The computer-based test system of claim 2, said synchronizer further performing synchronization of said architectural model cache with said behavioral model cache by:
   (v) receiving an architectural model cache access event from said architectural model, said architectural model cache access event affecting architectural model cache data, said architectural model cache access event corresponding to said behavioral model cache access event and said architectural model cache data corresponding to said behavioral model cache data;

(vi) sending a copy of said architectural model cache data if said architectural model cache contains a valid copy of said architectural model cache data; and if said architectural model cache does not contain a valid copy of said architectural model cache data:

(vii) flagging an error if said architectural model cache did not contain said architectural model cache data when said behavioral model executed said corresponding behavioral model cache access event;

(viii) sending said private copy of said affected architectural model cache data if said architectural model cache data had been destroyed; and (ix) sending a copy of said affected architectural model cache data from main memory if said affected architectural model cache data had not been destroyed.

4. The computer-based test system of claim 1, wherein said behavioral model cache event may include a cache a read, a modification, a move-in, or a move-out of data in said behavioral model cache.

5. The computer-based test system of claim 1, wherein if said behavioral model cache access event is legal, said synchronizer detects an architectural cache access violation by said behavioral caused by speculative or out-of-order instruction execution and flags an error.

6. The computer-based test system of claim 1, wherein said verifying is performed by:

(x) receiving an instruction retire event for a retiring instruction from s aid behavioral model;

(xi) retrieving a current behavioral model state from said behavioral model;

(xii) advancing said architectural until said architectural model sends a retire instruction event for said retiring instruction;

(xiii) retrieving a current architectural model state from said architectural model;

(xiv) comparing said current behavioral model state an d said current architectural model state; and (xv) flagging an error if said current behavioral model state and said current architectural model state do not match.

7. The computer-based test system of claim 1, further comprising a bus emulator configured to model the behavior of a system bus coupled to an external system environment, said bus emulator configured to send and receive control commands and data to and from the behavioral model.

8. The computer-based test system of claim 7, wherein the external system environment comprises a plurality of processors which support speculative out-of-order instruction execution.

9. A computer-based method for synchronizing the contents of a behavioral model cache due to cache accesses by a behavioral model of a computer architecture with the contents of an architectural model cache of an architectural model of said computer architecture, wherein said computer architecture has the ability to perform speculative out-of-order instruction execution, said method comprising the steps of:

(i) receiving a behavioral model cache access event, said behavioral model cache access event affecting behavioral model cache data;

(ii) verifying that said behavioral model cache access event is legal according to architectural rules of speculative and out-of-order instruction execution; and (iii) if legal, applying said behavioral model cache access event to said architectural model cache.

10. The method of claim 9, further comprising the step of:

(iv) before applying said behavioral model cache access event to said architectural model cache in step (iii), saving a private copy of affected architectural model cache data in the architectural model cache which will be affected by application of said behavioral model cache access event and which will be destroyed upon application of said behavioral model cache access event and which may still be used by any active instruction contained in an out-of-order instruction queue, wherein execution of each active instruction contained in said out-of-order instruction queue has been started.

11. The method of claim 10, further comprising the steps of:

(v) receiving an architectural model cache access event from said architectural model, said architectural model cache access event affecting architectural model cache data, said architectural model cache access event corresponding to said behavioral model cache access event and said architectural model cache data corresponding to said behavioral model cache data;

(vi) sending a copy of said architectural model cache data if said architectural model cache contains a valid copy of said architectural model cache data; and if said architectural model cache does not contain a valid copy of said architectural model cache data:

(vii) flagging an error if said architectural model cache did not contain said architectural model cache data when said behavioral model executed said corresponding behavioral model cache access event;

(viii) sending said private copy of said affected architectural model cache data if said architectural model cache data had been destroyed; and (ix) sending a copy of said affected architectural model cache data from main memory if said affected architectural model cache data had not been destroyed.

12. The method of claim 11, further for verifying cache access handling by said behavioral model, said method further comprising the steps of:

(x) receiving an instruction retire event for a retiring instruction from said behavioral model;

(xi) retrieving a current behavioral model state from said behavioral model;

(xii) advancing said architectural model until said architectural model sends a retire instruction event for said retiring instruction;

(xiii) retrieving a current architectural model state from said architectural model;

(xiv) comparing said current behavioral model state and said current architectural model state; and (xv) flagging an error if said current behavioral model state and said current architectural model state do not match.

* * * * *